Nov. 24, 1953

F. L. SCOTT ET AL 2,660,405

CUTTING TOOL AND METHOD OF MAKING

Filed July 11, 1947

FLOYD L. SCOTT
ALLEN E. WISLER
HENRY B. WOODS.
INVENTORS.

BY *Ray L. Smith*

Patented Nov. 24, 1953

2,660,405

UNITED STATES PATENT OFFICE 2,660,405

CUTTING TOOL AND METHOD OF MAKING

Floyd L. Scott, Allen E. Wisler, and Henry B. Woods, Houston, Tex., assignors to Hughes Tool Company, Houston, Tex., a corporation of Delaware Application July 11, 1947, Serial No. 760,414

6 Claims. (Cl. 255—347)

The invention relates to an improvement in cutting tools and in particular to roller earth boring drills. In particular the invention is concerned with the wear resisting qualities and the operating characteristics of such tools and drills.

The invention is concerned primarily with the manner of applying hard facing material at and proximate the cutting edges of such tools that a maximum efficiency in cutting rate and cutter life are obtained. It also comprehends the article produced in accordance with the method.

It is an object of the invention to utilize a hard facing material, such as tungsten carbide and the like, in a manner that maximum cutting action is obtained therefrom during the period of disintegration or wearing away of the cutting elements when in normal use.

Another object is to apply a hard facing material to the cutter elements on a cutter body in a manner that normal wearing away of the material and the cutter elements results in self-sharpening of the cutter elements.

Still another object of the invention is to facilitate the application of hard-facing material to cutter elements whereby relatively unskilled personnel can efficiently and effectively apply such material.

Another object is to form at least some of the cutting elements of a cutter with a recess or gash proximate the cutting edge thereof and thereafter filling such recess or gash with hard facing material and a matrix metal.

It is a further object to provide hard facing material on one face of a cutter element so that wearing away of the complementary face thereof maintains a cutting edge at or near the first mentioned face.

Still another and more specific object of the invention, in one form, is to provide hard facing material on the rear or trailing face of a cutter element so that wearing away of the forward portion of the cutter element maintains a cutting edge at or near the rear or trailing face.

The invention also comprehends the application of hard facing to a cutter element in a manner that it possesses sufficient body to resist early breakage as the surrounding body of the cutter element wears away.

These and other objects of the invention will be more fully apparent from the following description considered in connection with the drawings in which.

Figure 1:
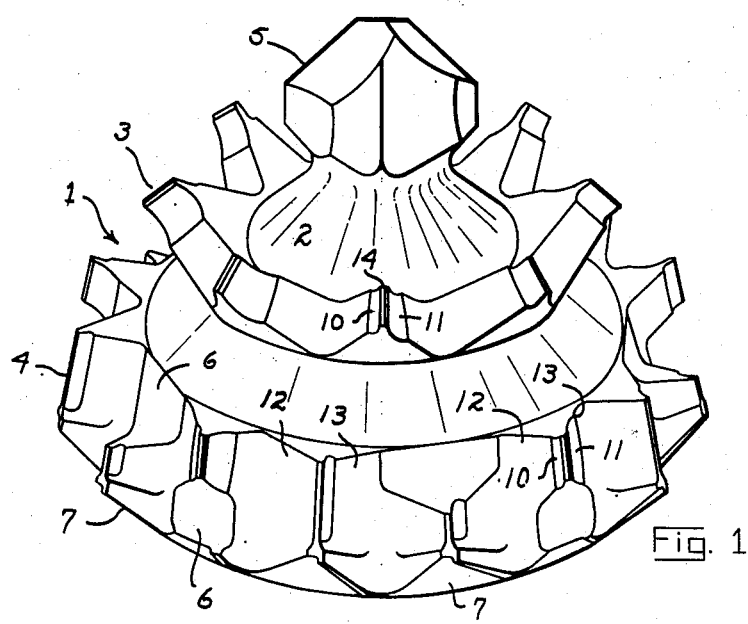
Fig. 1 is a perspective view of a cone type of cutter prepared for the application of a hard facing material in accordance with the invention.

The invention is illustrated in Fig. 1 as applied to an approximately conical shaped cutter 1, for the cone type of rotary earth boring drills, although it is to be understood that the invention is applicable to cutters of other shapes.

The cutter 1 comprises a body 2 having circumferential rows of cutting teeth 3 and 4 thereon, a spear point 5 being provided on the particular cutter shown. At least some of the outermost row of teeth 4 are cut away or interrupted as shown at 6 and the end periphery of the body and teeth present a gage surface 7 to bear against the wall of the hole and maintain uniform size thereof as drilling progresses.

Hard surfacing in accordance with the invention may be carried out on all of the teeth or cutter elements of the rows 3 and 4 and also on the spear point 5 and each of the teeth and the spearpoint is shown as prepared for hard facing. It is understood, of course, that the invention may be applied to part or all of the teeth and/or the spearpoint.

Figure 2:
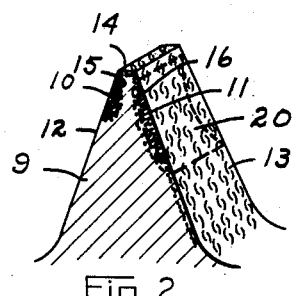
Fig. 2 is an enlarged perspective section through a cutter element or tooth illustrating the use of the invention.

In the illustrated cutter 1, and as shown in greater detail in Fig. 2, the cutter elements, identified as 9, are gashed at 10 and 11 on the leading and trailing faces 12, 13 respectively. Such gashing may be effected as desired by a straddle or pencil milling operation or the toothed cutter may be initially formed with the gashes. These gashes preferably extend entirely across the faces 12 and 13 and are of such configuration that the projection or fin 14 has substantially parallel side faces 15 and 16.

By way of explanation, the face 12 is referred to as a "leading" face, as this is the face of the tooth or cutter element that first engages a formation material to be cut by the tooth as the cutter 1 rotates in normal operation to carry the cutter elements to and through the actual cutting operation. In normal operation the bit head rotates clockwise when viewed from above.

The lower or inner end of each of the gashes 10 and 11 is arcuate. This configuration enhances the ease with which the cutter elements are prepared for the application of the hard facing material 20 and also facilitates the application of such material.

When applying the hard facing material 20, a flame is applied to the surface formed by the gashes 10 and 11, and to a stick or rod which includes the hard facing particles and a matrix steel. The environment provided by the gashes enables the operator to easily obtain such deposit of hard surfacing material and matrix metal that a symmetrical tooth outline results. Furthermore, uniformity in size and shape of the cutter teeth is maintained even where relatively unskilled operators apply the hard facing.

Preferably, the deposit of hard facing material on the trailing face 13 of the cutter element or tooth 9 extends substantially throughout the face surface to enhance operating characteristics as will more fully appear.

Figure 3:
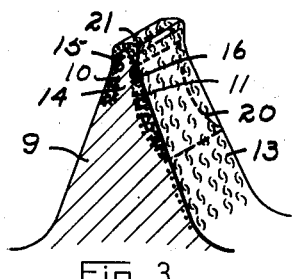
Fig. 3 is similar to Fig. 2 but shows a modified adaptation of the invention.

The embodiment shown in Fig. 3 is the same as that shown in Fig. 2 except that an initial bead 21 of hardfacing material is first deposited upon the crest of the fin 14. This bead slightly overhangs the edges of the crest of the fin 14 and hence comprises a small dam which cooperates with the adjacent gashes to enable an effective deposit of hard facing material. Thereafter the gashes 10 and 11 are filled with hard facing material in the manner already described. The resulting structure presents a substantial body of hard facing material at the crest of the tooth to resist chipping and also to resist wear during the early stages of use of the cutter while it yet maintains its original sharpness.

Figure 4:
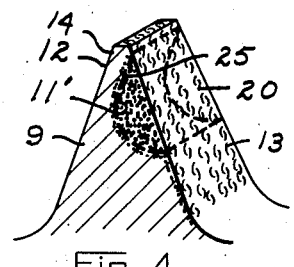
Fig. 4 shows the invention as used with a modified cutter element configuration to receive the hard facing, abrasion resistant material.

In the alternate construction shown in Fig. 4, a single gash 11' is provided in the trailing face of the cutter element 9, this gash being of such configuration that the face 25 is substantially parallel with the leading face 12 of the cutter element.

Figure 5:
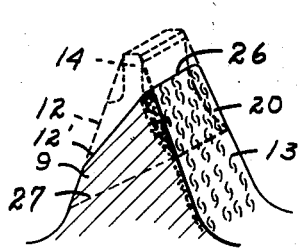
Fig. 5 is similar to Fig. 2 but illustrates the manner of self-sharpening of the cutter element as normal wear takes place.

Not only do the structures and techniques above described provide indicated advantages but there is further provided a self-sharpening feature as is illustrated in Fig. 5. The dotted outline indicates the original tooth shape. So long as wear does not materially alter this shape, a relatively sharp tooth crest is presented to effect cutting. As wear progresses and impairment of cutting action results, the deposit of hard facing material on the leading face 12 is dissipated and faster wearing on the underlying body material takes place whereby the leading face is modified as shown at 12' and terminates rearwardly in the cutting edge or crest 26 of hard facing material, which possesses sufficient body to resist chipping and which therefore extends the effective cutting life of the cutter. As further wear takes place the leading face approaches the configuration indicated at 27 when, obviously, the cutter has served its maximum useful life.

Figure 6:
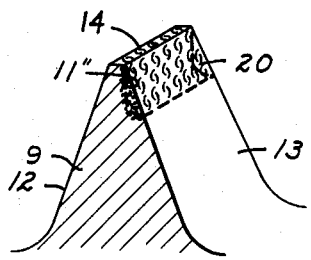
Fig. 6 shows still another form of tooth configuration and hard facing material applied thereto.

A slight modification from that shown in Fig. 4 is illustrated in Fig. 6, wherein the tooth 9 is provided with a gash 11" having its inner wall extending substantially normal to the crest of the fin 14. This construction likewise provides a substantial body of hard facing particles and matrix metal which is easily applied by virtue of the tooth configuration provided.

Figure 7:
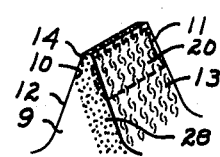
Fig. 7 is a perspective view of a tooth showing the application of hard facing to the tooth end to cooperate with that applied to the tooth faces.

Fig. 7 is similar to Fig. 2 but is a perspective view which shows the application of hard facing material upon the end of the tooth 9 to cooperate with that deposited upon the flanks of the tooth and thereby enhance the effectiveness of the cutter element. Such end facing may be applied upon either or both ends of the tooth, but is preferably applied at least to that end which is subjected to the most abrasive action. It comprises a band or strip 28 of hard facing material covering an area substantially parallel with the face 13 of the tooth 9 and of a width to extend downwardly along the face 12 to the base of the gash 10. The end facing so applied minimizes cutting away of the tooth longitudinally and hence the cutting edge 26, resulting from self-sharpening, extends throughout the full initial crest length of the tooth.

It has been found highly advantageous to precede the hard facing, as above described, by a wet application of hard facing at the tooth crest when using the forms shown in Figs. 2, 4, 6 and 7. That is, a greater concentration of hard facing at the crest to maintain initial sharpness, is had by first applying a suitable binder upon the crest of the fin 14 and for a short distance down each side face thereof. Such a binder may comprise a sodium silicate solution, or the like, to which particles of hard facing will adhere but which will not deleteriously affect the metal but may rather produce a desirable fluxing action during succeeding steps. Hard facing particles are either carried by or are sprinkled on the coated surface.

When such wet application of a hard facing material is used the application of heat to deposit of hard facing material on the adjacent faces, as above described, provides effective embedment of the particles at the crest of the tooth.

Although, as already indicated, the invention is illustrated as applied to a cone type of cutter, it is to be understood that the invention is applicable to other types of rotary cutters or any cutter having a cutting element with leading and trailing faces, to which the application of hard faced material is capable of improving the wear-resisting properties and, as well, other operating characteristics thereof. While the foregoing suggests that the hard facing applied in accordance with the invention shall preferably extend a greater distance downwardly along the trailing face, as illustrated in Figs. 2 and 3, or shall be applied to the trailing face as illustrated in Figs. 4 and 6, it is to be understood that these conditions may be reversed without departing from the spirit of the invention.

Broadly, the invention contemplates a method of producing a new and improved cutting tool or drill and the manufacture or article produced thereby.

What is claimed is:

1. The method of improving the wear resistant qualities of a cutting element comprising the steps of, providing gashes across opposite faces of the cutter element proximate the cutting edge thereof to form an upstanding fin, depositing a bead of wear resistant material upon the crest of the fin formed between the gashes, and thereafter depositing a hard facing material within the space formed by the walls of the gashes and the bead.

2. The method of improving the wear resistant qualities of a cutting element having a generally triangular cross section comprising the steps of forming a gash across the trailing face of the element proximate and extending to the crest thereof, said gash being formed in a manner to provide an inner face substantially parallel with the other flank of the element and terminating at its innermost end in an arcuate surface, and depositing a body of wear resisting material in the gash to provide a substantially symmetrical cutter element.

3. A roller cutter for an earth boring drill including a cutting element of generally triangular cross section presenting faces converging to a cutting edge or crest, a pair of gashes in and extending completely across said faces and forming an upstanding fin, said faces being of unequal extent along the converging faces from the crest of the fin and a quantity of hard facing material filling said gashes, whereby the wearing away of the cutting element results in self-sharpening with a cutting edge proximate the face having the greater extent of hard facing material.

4. A roller cutter for an earth boring drill including a cutting element of generally triangular cross section presenting faces converging to a cutting edge or crest, a gash in at least one of said faces extending across the face of the cutting element and to said edge and of a depth to form an upstanding fin, said gash having an arcuate end merging with the associated face, and a quantity of hard facing material filling said gash, whereby the wearing away of the cutting element results in self-sharpening of the element with the cutting edge proximate the face having the hard facing material.

5. The method of improving the wear resistant properties of a cutting element or tooth having a generally triangular cross section comprising the steps of, providing gashes across the leading and trailing faces of the cutter element and extending to the cutting edge thereof to provide an upstanding fin, the face on the trailing face extending the greater distance along the tooth face, depositing a bead of wear resistant material upon the crest of the fin, and thereafter depositing hard facing material within the space formed by the walls of the gashes and the bead whereby initial sharpness of the tooth is maintained and wearing away of the tooth results in self-sharpening with a cutting edge at the face having the greater extent of hard facing material.

6. The method improving the wear resistant qualities of a cutting element or tooth having a generally triangular cross section comprising the steps of, providing gashes on opposite faces of a cutter element proximate the cutting edge thereof, said gashes extending across the respective faces and to the crest of the element thereby forming an upstanding fin, said gashes extending unequal distances along the faces of the element from the crest of the fin and having arcuate inner ends merging with the faces, and welding within said gashes a hard facing material to provide a cutting element of triangular cross section.

FLOYD L. SCOTT.
ALLEN E. WISLER.
HENRY B. WOODS.

References Cited in the file of this patent

UNITED STATES PATENTS

| Number | Name | Date |
| --- | --- | --- |
| 1,799,318 | Rehback | Apr. 7, 1931 |
| 1,835,701 | Edmunds | Dec. 8, 1931 |
| 1,855,330 | Zublin | Apr. 26, 1932 |
| 1,960,879 | Russell et al. | May 29, 1934 |
| 2,033,594 | Stoody | Mar. 10, 1936 |
| 2,089,481 | Howard | Aug. 10, 1937 |
| 2,104,822 | Scott | Jan. 11, 1938 |
| 2,148,925 | Bochy | Feb. 28, 1939 |
| 2,223,864 | Zublin | Dec. 3, 1940 |
| 2,294,544 | Garfield | Sept. 1, 1942 |
| 2,306,683 | Zublin | Dec. 29, 1942 |